March 27, 1956     L. O. FUNDERBURK, JR     2,739,804
WEIGHING AND TRANSFERRING APPARATUS

Filed April 2, 1953     7 Sheets-Sheet 1

INVENTOR
LUTHER O. FUNDERBURK, JR.

BY

ATTORNEY

March 27, 1956

L. O. FUNDERBURK, JR 2,739,804

WEIGHING AND TRANSFERRING APPARATUS

Filed April 2, 1953

INVENTOR
LUTHER O. FUNDERBURK, JR.

BY

ATTORNEY

FIG. 5.

March 27, 1956  L. O. FUNDERBURK, JR  2,739,804
WEIGHING AND TRANSFERRING APPARATUS
Filed April 2, 1953  7 Sheets-Sheet 5

INVENTOR
LUTHER O. FUNDERBURK, JR.

BY

ATTORNEY

March 27, 1956 L. O. FUNDERBURK, JR 2,739,804
WEIGHING AND TRANSFERRING APPARATUS
Filed April 2, 1953 7 Sheets-Sheet 6

INVENTOR
LUTHER O. FUNDERBURK, JR.
BY
ATTORNEY

March 27, 1956  L. O. FUNDERBURK, JR  2,739,804
WEIGHING AND TRANSFERRING APPARATUS
Filed April 2, 1953  7 Sheets-Sheet 7

INVENTOR
LUTHER O. FUNDERBURK, JR.

BY

ATTORNEY

United States Patent Office 2,739,804
Patented Mar. 27, 1956

2,739,804

WEIGHING AND TRANSFERRING APPARATUS

Luther O. Funderburk, Jr., Camden, S. C.

Application April 2, 1953, Serial No. 346,453

9 Claims. (Cl. 265—52)

My invention relates to weighing and transferring apparatus.

In the ready mix concrete industry, it is usual practice to employ a large stationary elevated bin, beneath which a truck mounted concrete mixer is driven to receive dry concrete aggregates, to be mixed with water on the truck, while being transported to the site of the work. The elevated bin has a discharge chute for the dry aggregates, arranged at a fixed elevation above the mobile concrete mixer, and endless conveyor belts in the bin carry the aggregates to the discharge chute in the desired proportions.

There are several inherent disadvantages in this arrangement. First, the bin is not portable and may be in the form of a permanent building, thus limiting the operating range of the mobile concrete mixers from the site of the bin. Also, considerable waste of the dry concrete aggregates occurs, due to the fact that the discharge chute of the bin is a substantial distance above the intake hopper of the mixer to be loaded, and a safe clearance between the top of the mixer truck and floor of the elevated bin must be provided. Also different types of mixer trucks require different head clearances, and this must be provided for in the height of the bin. Because of these factors, considerable amounts of the dry aggregates discharging from the discharge chute of the bin miss the intake hopper of the mixer truck and are spilled upon the ground. Also some of the dry aggregates spill from the moving conveyor belts of the bin and are wasted. Another disadvantage of this conventional system is that the proportions of the dry aggregates moving on the conveyor belts to the discharge chute of the bin cannot be conveniently regulated or changed at will, as is sometimes desirable, and the weighing of the dry aggregates to make up the batch of concrete must be accomplished with separate apparatus in the elevated bin, before the dry aggregates are placed upon the conveyor belts.

It is a primary object of the present invention to provide apparatus free of the above mentioned disadvantages for weighing dry concrete aggregates, and transferring the same to a mobile concrete mixer.

A further object is to provide apparatus of the above mentioned character which is relatively light weight and portable, so that it may be towed on the highway to various locations by a truck, or the like.

A further object of the invention is to provide apparatus of the above mentioned character, including built-in mechanism for accurately weighing each batch of dry concrete aggregates, prior to their delivery to the mobile concrete mixer.

A further object is to provide in apparatus of the above mentioned type, an elevatable hopper which is filled, raised and lowered by a shovel tractor, or the like, and subsequently positioned in exactly the right height above the mobile concrete mixer, so that none of the aggregates will be spilled while discharging into the mixer.

A further object is to provide apparatus of the mentioned type, so constructed that the shovel loading tractor and mobile concrete mixer can approach the elevatable hopper from opposite sides of the apparatus, without interfering with the structural members of the apparatus. A still further object is to provide apparatus of the above mentioned character which is simplified and relatively inexpensive in construction, rugged and durable, and reliable and efficient in operation.

Other objects and advantages of the invention will be apparent during the course of the following description.

In the accompanying drawings, forming a part of this application, and in which like numerals are employed to designate like parts throughout the same:

Figure 13 is an enlarged fragmentary horizontal section on line 13—13 of Figure 6, Figure 14 is a side elevation of the apparatus in a lowered, generally horizontal position, and mounted on wheels for transportation behind a towing vehicle, Figure 15 is a fragmentary side elevation of the apparatus shown in Figure 14, with parts broken away to show pins for locking the hopper to the elevatable carriage during transportation of the apparatus, Figure 16 is a similar fragmentary side elevation of the apparatus in Figure 14, showing means for locking the carriage to the base of the apparatus during transportation, and, Figure 17 is a fragmentary vertical section on line 17—17 of Figure 14, rotated 90 degrees.

In the drawings where for the purpose of illustration is shown a preferred embodiment of my invention, the numeral 20 designates generally a rigid horizontal base for the apparatus, including parallel longitudinal I-beams 21, rigidly connected near their forward and rear ends by transverse parallel I-beams 22 and 23. The forward transverse I-beam 22, is spaced somewhat rearwardly of the forward ends of the beams 21, Figures 2 and 9, and the rear transverse I-beam 23 is spaced an even greater distance forwardly of the rear ends of the beams 21. This arrangement permits the front wheels of a shovel loading tractor to pass between the rear ends of the beams 21, without interference with the rear transverse beam 23. Likewise the forward transverse beam 22 will not interfere with a wheel mounted axle, to be described, which is applied to the forward ends of the beams 21, when the apparatus is to be transported.

The I-beams 21 are further rigidly connected near their longitudinal centers with a rigid horizontal transverse tube 24, circular in cross section, and parallel with the transverse beams 22 and 23. Horizontal diagonal braces 25 may be employed for further rigidly connecting the longitudinal and transverse beams 21, 22 and 23, Figure 9.

Figure 9:
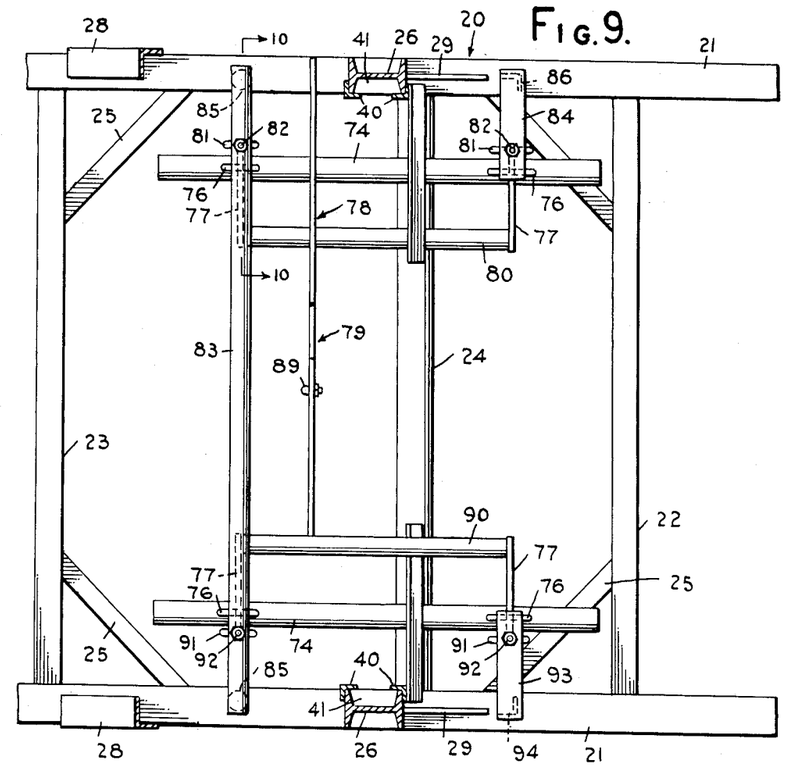
Figure 9 is a horizontal cross-section taken substantially on line 9—9 of Figure 3.

Rigidly mounted upon the horizontal I-beams 21 near and somewhat forwardly of their longitudinal centers is a pair of vertical columns or guide rails 26, preferably about 20 feet long, and the columns 26 are also in the form of I-sections, as indicated. As shown in Figure 9, the vertical columns 26 are arranged slightly rearwardly of the transverse tube 24. The columns 26 are perpendicular to the horizontal base 20, and have their upper ends rigidly connected by means of a transverse horizontal brace bar 27, welded or otherwise rigidly secured thereto. The brace bar 27 forms with the columns 26 an upright open rectangular frame, perpendicular to the base 20. Inclined braces 28 have their lower ends rigidly secured by welding or the like to the longitudinal I-beams 21 a substantial distance rearwardly of the columns 26 and near the rear transverse beam 23. The upper ends of the braces 28 are rigidly secured by welding or the like to the rear sides of the columns 26, a substantial distance above the base 20. The columns are further braced at their forward sides by triangular webs 29, rigidly connecting the columns and longitudinal I-beams 21.

Figure 1:
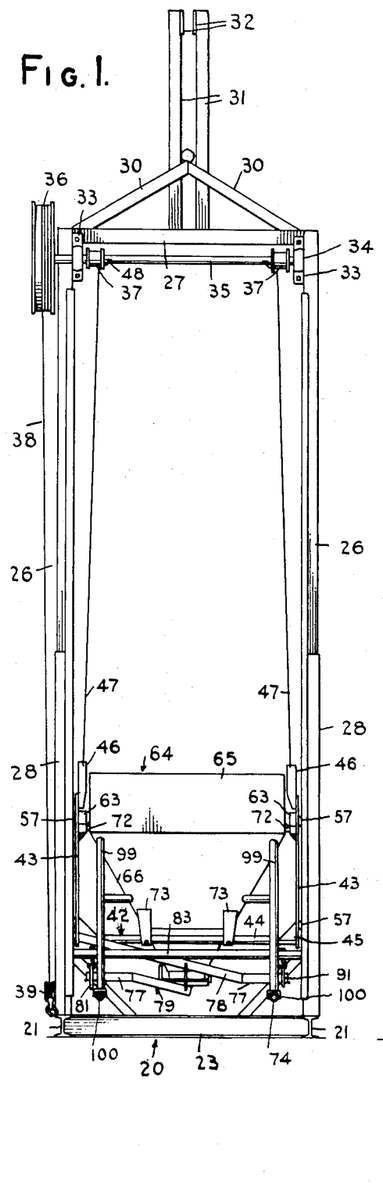
Figure 1 is a rear elevation of the apparatus embodying the invention.

Upwardly converging brace bars 30 have their lower ends rigidly secured to the bar 27, and their upper ends are joined together by welding or the like, Figure 1. A pair of parallel vertical tongue sections 31 have their lower ends rigidly secured to the transverse bar 27, and are also rigidly secured at intermediate points to the converging brace bars 30, in underlying relation thereto, Figures 1 and 2. The tongue sections 31 are provided near their free extremities with spaced opposed apertured plates 32, adapted to receive a hitch bolt or the like, of a suitable towing vehicle, when the apparatus is being transported in a manner to be described.

Figure 5:
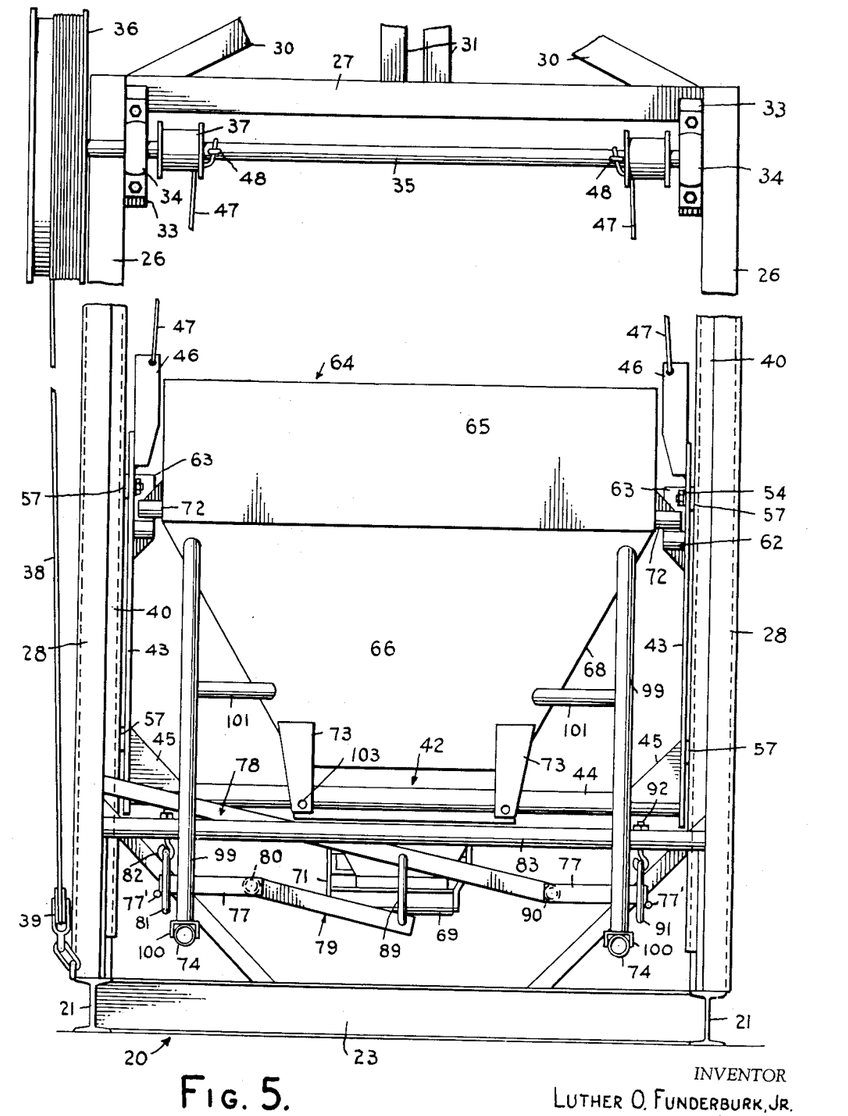
Figure 5 is a further rear elevation of the apparatus, on an enlarged scale, and showing the hopper resting upon built-in weighing mechanism, parts broken away.

Corner vertical mounting plates 33 are arranged adjacent to the rear sides of the columns 26, and rigidly secured thereto and to the transverse bar 27, see Figure 5. Self aligning bearings 34 are rigidly mounted upon the corner mounting plates 33, and projecting beyond the rear sides of the columns 26, as shown. A transverse horizontal shaft 35 is journaled within the bearings 34 for free rotation, and one end of this shaft projects laterally outwardly of the left hand column 26 shown in Figure 5, for receiving a large winding spool 36, rigidly secured thereto for rotation therewith. Small winding spools 37 are rigidly secured to the rotatable shaft 35, near and inwardly of the bearings 34, for rotation with the shaft.

A cable 38 has one end fastened to the large spool 36, upon which the cable is adapted to be wound. The cable 38 extends downwardly from the rear side of the large spool 36, Figure 2, and is trained under a small sheave 39, swivelly mounted upon the adjacent beam 21 of the base 20, Figures 2 and 5. After passing under the sheave 39, the cable 38 extends horizontally rearwardly of the apparatus for connection with the shovel loading tractor, not shown, which tractor is employed for filling, raising and lowering the elevatable hopper to be described.

On the inner sides of the vertical columns 26, adjacent to their forward and rear corners, are rigidly mounted pairs of opposed vertical angle bars 40, and extending throughout substantially the entire lengths of the vertical columns. The angle bars 40 form with the columns 26 long vertical passages 41.

A generally U-shaped elevatable carriage 42 is arranged between the columns 26, and comprises opposed vertical side plates 43, arranged just inwardly of the vertical angle bars 40, in opposition thereto. The side plates 43 are rigidly connected at their lower ends by a horizontal transverse bar 44, circular in cross section, and corner webs 45 are welded or otherwise rigidly secured to the side plates 43 and tube 44, as shown, to add rigidity to the U-shaped carriage 42. Vertical cable attaching plates 46 are rigidly secured to the inner faces of the side plates 43, at right angles thereto, adjacent to their upper ends, and the corresponding ends of cables 47 are attached to the apertured plates 46, as shown. The other ends of the cables 47 are attached to the small spools 37 on the shaft 35, and the cables 47 are adapted to be wound upon the small spools when the carriage 42 is elevated. The upper ends of the cables 47 pass through openings formed in the spools 37 and are firmly clamped to the shaft 35 by clamp plates 48.

Figures 13, 14, 15, 16, 17:
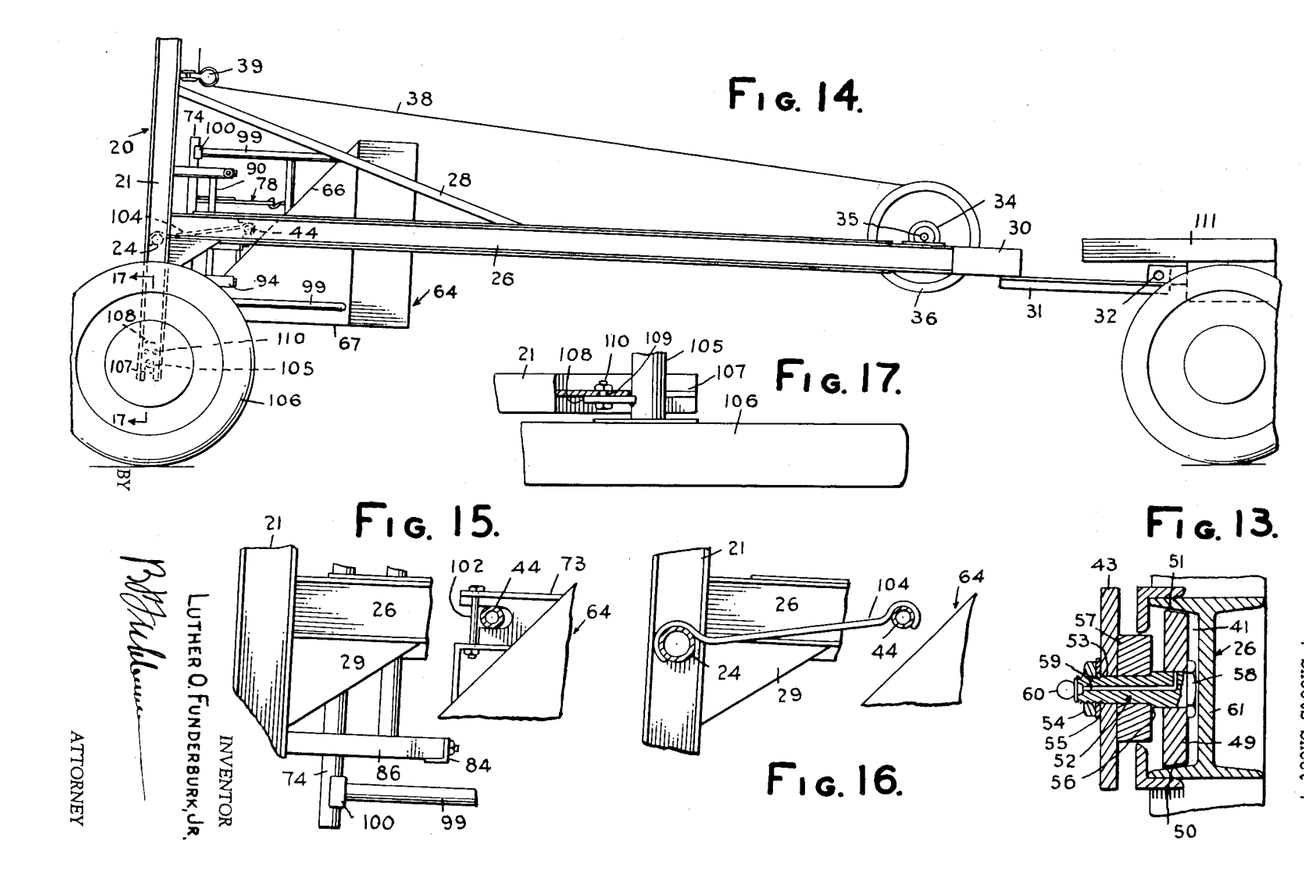

The carriage 42 is operatively connected with the vertical columns 26 by means of vertically spaced pairs of rollers 49, arranged within the vertical passages 41, and adapted to roll along the forward and rear vertical flanges 50 and 51 of the columns 26, Figure 13. The rollers 49 have their peripheries somewhat tapered for parallelism with the internal faces of the I-beam flanges, as shown. The rollers 49 are rotatably mounted upon horizontal stub shafts 52, extending through openings 53 in the carriage side plates 43. The inner ends of the stub shafts 52 are screw-threaded, inwardly of the side plates 43, for the reception of nuts 54 and flat washers 55. Near their outer ends, the stub shafts 52 have enlarged portions forming shoulders 56, and spacers 57 are mounted upon the stub shafts and claimped between the shoulders 56 and carriage side plates 43, when the nuts 54 are drawn up tight. The outer ends of the stub shafts 52 have hexagonal heads 58 formed thereon, for engagement with the rollers 49, to prevent the same from disengaging the stub shafts 52, the rollers being held captive between the heads 58 and spacers 57, and free to shift axially therebetween during rotation. With this arrangement, the rollers 49 may readily follow the internal services of the flanges 50 to 51, without binding, when such surfaces are not perfectly smooth and straight. The rollers 49 are lubricated with grease, introduced into internal passages 59 of the stub shafts 52, the inner ends of the stub shafts being provided with removable grease fittings 60. The heads 58 of the stub shafts 52 are arranged close to the main vertical webs 61 of the columns 26, Figure 13, and may slidably contact the same at some points during the vertical travel of the carriage 42. As shown in the drawings, the vertically spaced pairs of rollers 49, and associated elements are arranged near the upper and lower ends of the carriage side plates 43.

It is thus seen, that the U-shaped carriage 42, which is rigid, has its rollers 49 locked or caged within the longitudinal passages 41 formed by the columns or uprights 26 and the angle bars 40. With this arrangement, it is impossible for the long columns 26 to bow outwardly near their longitudinal centers or spread apart appreciably. Engagement of the rollers 49 with the angle bars 40 prevents this, and the carriage 42 thus constitutes a movable bracing means for the columns 26, in all adjusted positions of the carriage 42. This arrangement renders it possible to eliminate cross bracing or tying members between the uprights 26, except the single transverse bar 27 at the extreme tops of the uprights. The uprights or columns 26 are entirely unobstructed between their inner sides, throughout substantially their entire lengths, and the carriage 42 affords adequate lateral or transverse bracing for the tower comprising the uprights 26.

Near and below the upper stub shafts 52, a pair of opposed U-bearings 62 are rigidly secured by welding or the like to the inner faces of the carriage side plates 43. The forward sides 63 of these U-bearings project a substantial distance vertically above their rear sides, Figure 8, for a purpose to be described.

A hopper 64 is arranged between the carriage side plates 43, and has its upper end open. The upper portion of the hopper is rectangular and has vertical side walls 65. Below the vertical side walls 65, the rear side 66 of the hopper slopes downwardly and forwardly, Figures 2 and 3, and is also tapered downwardly as viewed from the rear, in Figures 4 and 5. The forward side 67 of the hopper, below the upper side walls 65 is vertical, and converges with the rear inclined side 66, Figures 2 and 3. The other two sides 68 of the hopper, below the vertical side walls 65, are inclined, Figure 4, and likewise converge downwardly. All of the hopper sides are integrally joined by welding, or the like.

Figure 2:
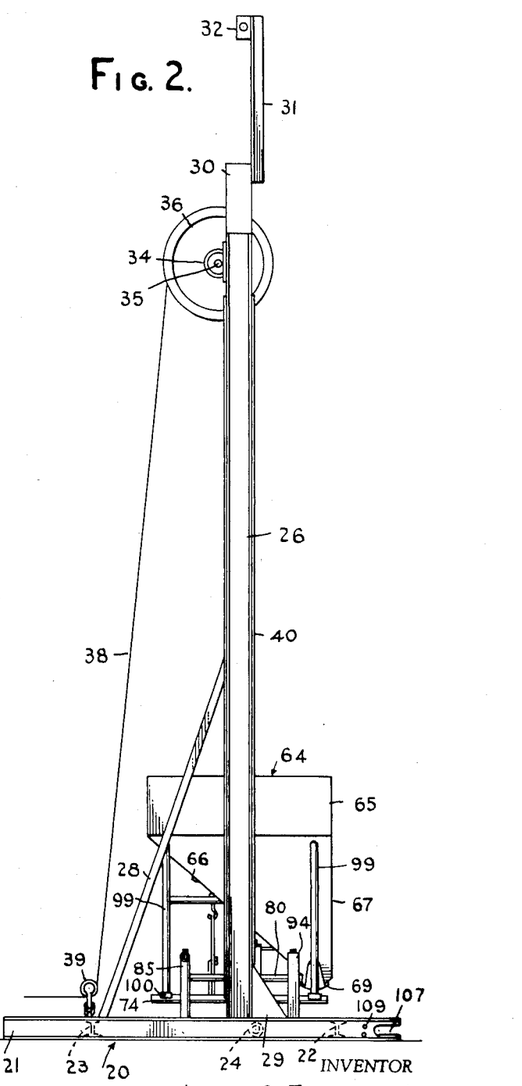
Figure 2 is a side elevation of the same.
Figure 3:
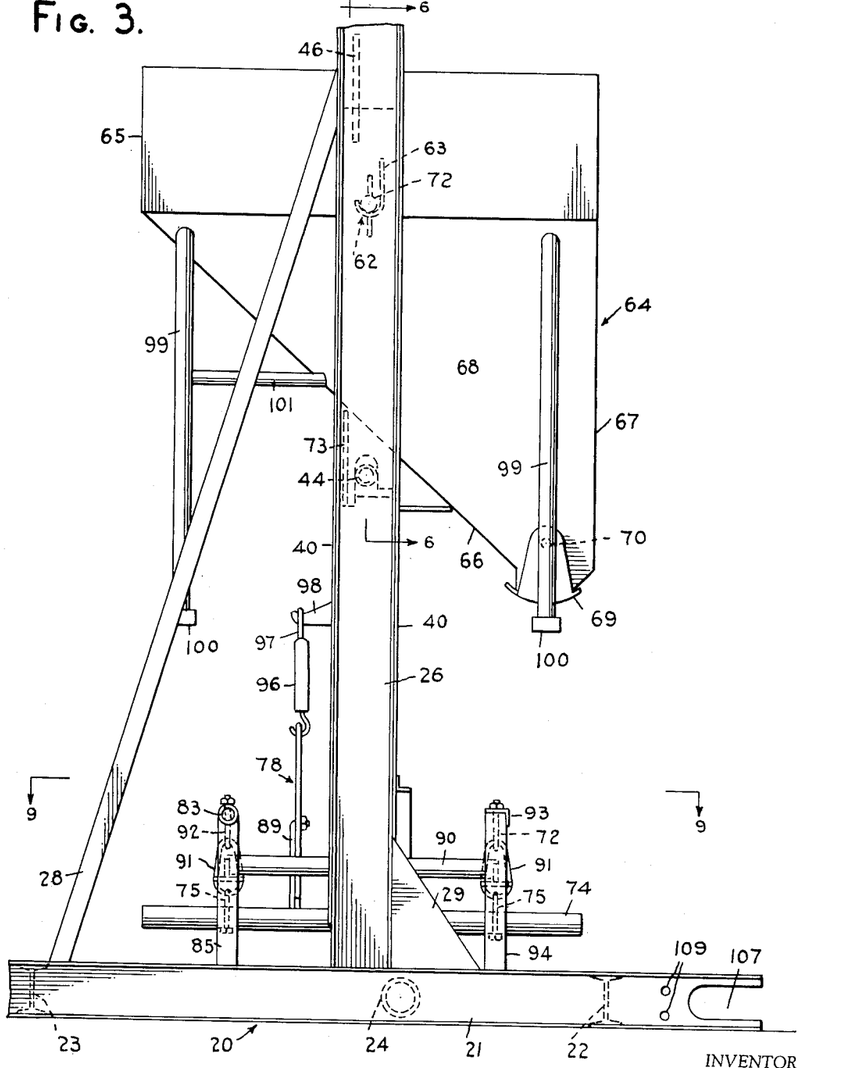
Figure 3 is a side elevation, on an enlarged scale of a lower portion of the apparatus, with the hopper in a somewhat elevated position.

As shown in Figures 2 and 3, the forward vertical side 67 of the hopper 64 is spaced a substantial distance forwardly of the vertical columns 26, and the rear vertical side wall 65 is spaced an equal distance rearwardly of the columns 26. It is necessary to space the forward side 67 and the lower discharge end of the hopper, having the pivoted gate valve 69, a substantial distance forwardly of the columns or uprights 26, so that the hopper may properly discharge its contents into the intake cone or hopper of the concrete mixer truck. The truck is backed up toward the forward side 67 of the hopper, and the intake cone of the truck is positioned directly below the bottom discharge end of the hopper having the gate valve 69. If the forward side 67 of the hopper were arranged close to the forward sides of the columns 26, the concrete mixer truck would strike or interfere with the columns 26, before the intake cone of the truck could be positioned beneath the gate valve 69. Accordingly, the hopper 64, because of its particular shape, has its center of gravity located somewhat forwardly of the columns 26, Figure 3, and the hopper 64 is connected with the carriage 42 rearwardly of its center of gravity, as will presently be described. This is necessary, in order to position the lower discharge end of the hopper a sufficient distance in advance of the columns 26, to enable the intake cone of the mobile concrete mixer to be positioned directly underneath the gate valve 69, without having the concrete mixer strike the columns 26.

The lower tapered end of the hopper 64 is its discharge end, which has an opening formed therein, and a pivoted gate valve 69 serves to cover the discharge opening of the hopper. The gate valve 69 is mounted upon a horizontal rock shaft 70, journaled upon the hopper sides 68, near their lower ends. The gate valve 69 is provided with an operating handle 71, and the valve is normally maintained closed by gravity. The arrangement of the discharge opening is such that when the gate valve 69 is swung manually to the open position, the contents of the hopper will be discharged downwardly and forwardly of the hopper.

Figure 4:
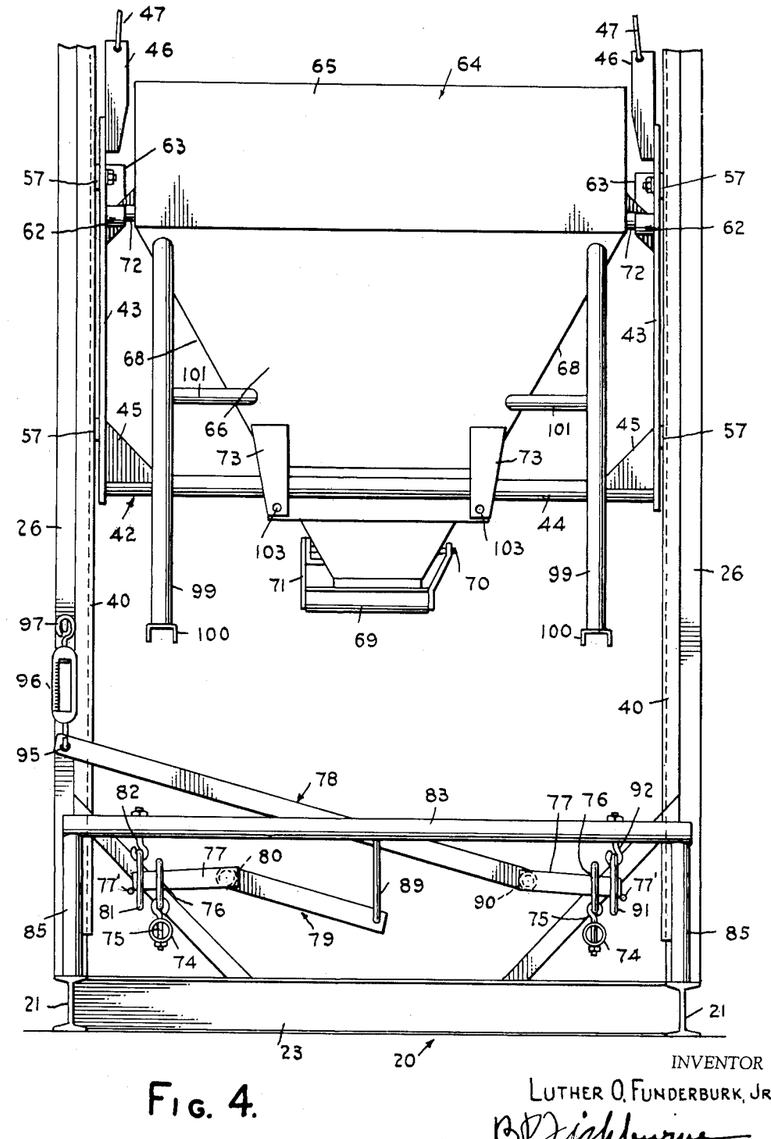
Figure 4 is a rear elevation of the apparatus shown in Figure 3.
Figures 6, 7, 8:
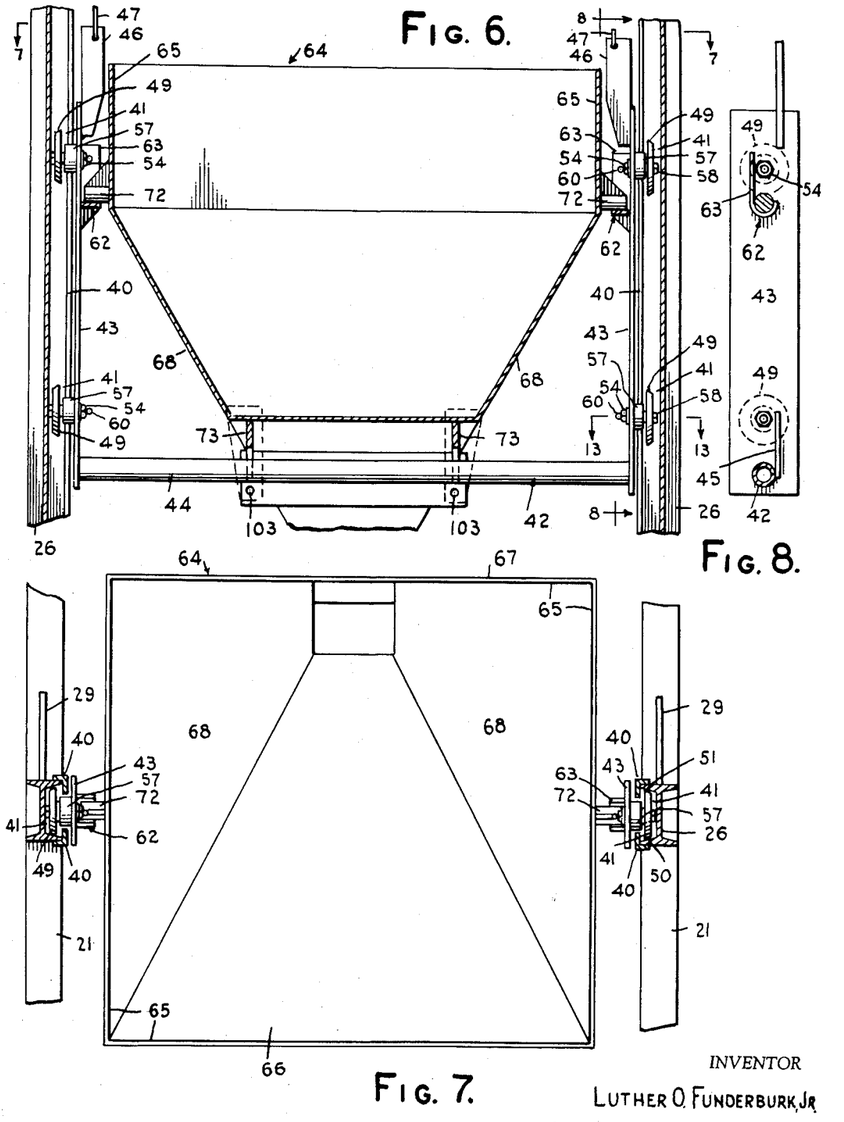
Figure 6 is a fragmentary vertical section on line 6—6 of Figure 3.
Figure 7 is a horizontal cross section, taken substantially on line 7—7 of Figure 6.
Figure 8 is a vertical section on line 8—8 of Figure 6, parts omitted.

The hopper 64 is provided upon opposite sides and near the lower edges of the vertical walls 65 with a pair of short horizontal trunnions 72, rigidly secured thereto, and these trunnions are engageable within the upwardly opening U-bearings 62, the ends of the trunnions terminating just inwardly of the carriage side plates 43, as best shown in Figure 6. The hopper 64 is bodily suspended from the U-bearings 62 by the trunnions 72, and the U-bearings carry the weight of the hopper. The trunnions 72 are however, arranged rearwardly of the center of gravity of the hopper 64, as previously suggested, and the hopper tends to turn clockwise about the trunnions 72 as viewed in Figure 3. In order to counteract this tendency, a pair of inverted U-shaped brackets 73 are rigidly secured by welding to the rear sloping side 66 of the hopper, a substantial distance below the U-bearings 62, and in vertical alignment therewith, Figure 3. The inverted U-shaped brackets 73 are spaced apart laterally as shown in Figure 4, and receive the transverse bar 44 of the carriage 42, when the trunnions 72 are seated within the U-bearings 62. The brackets 73 prevent the hopper 64 from pivoting about the trunnions 72, while the trunnions are seated in the U-bearings 62, and the hopper remains upright when resting upon the carriage 42. During operation of the apparatus, the hopper 64 never actually pivots or swings about its trunnions 72, although it will tend to do this, due to the fact that it is not supported at its center of gravity. The coaction of the brackets 73 with the bar 44 counteracts the tendency of the hopper to pivot or turn clockwise in Figure 3, and the hopper actually remains in the upright or vertical position at all times, except when the apparatus is arranged in the horizontal position for transportation, as shown in Figure 14.

Means are provided to weigh the hopper 64, and its contents, when the carriage 43 and hopper are in lowered positions, as shown in Figures 1 and 2. This means comprises a pair of parallel horizontal scale beams 74, disposed a slight distance above the horizontal base 20, inwardly of the columns 26 and I-beams 21. The scale beams 74 extend longitudinally of the I-beams 21 and parallel therewith, Figure 9. The scale beams 74 are provided near and inwardly of their ends with vertical eye bolts 75, rigidly secured thereto and projecting above the same. The eye bolts 75 are pivotally connected with knife edge scale links 76, extending thereabove and receiving generally horizontal arms 77 of vertically swingable force transmitting levers 78 and 79. The lever 79 is arranged beneath the lever 78, in parallel relation therewith, and is substantially shorter than the lever 78. Both of the levers 78 and 79 are inclined somewhat, Figure 4. The lever 79 has one end rigidly secured to a horizontal rigid connecting bar 80, which extends transversely beyond the opposite sides of the lever 79 for substantial distances. The connecting bar 80 has its ends rigidly secured to a pair of the arms 77, Figure 9, and bodily carries the same.

The outer ends of the pair of arms 77, connected with the bar 80 are received within a second pair of knife edge scale links 81, arranged close to the adjacent scale links 76 and outwardly thereof, Figure 4. The upper ends of the scale links 81 are pivotally secured to depending eye bolts 82, rigidly secured to transverse horizontal bars 83 and 84, near and above the opposite ends of the scale beams 74, Figure 9. The horizontal bar 83 is disposed nearest the rear end of the base 20 and extends entirely across the base, and has its ends rigidly mounted upon relatively short upright posts 85, in turn rigidly mounted upon the longitudinal I-beam 21, Figure 4. The horizontal bar 84, near the forward end of the base 20 extends for a relatively short distance transversely inwardly of the adjacent I-beam 21, Figure 9, and has its outer end rigidly secured to a relatively short vertical post 86, in turn rigidly mounted upon the adjacent horizontal I-beam 21.

Figures 10, 11:
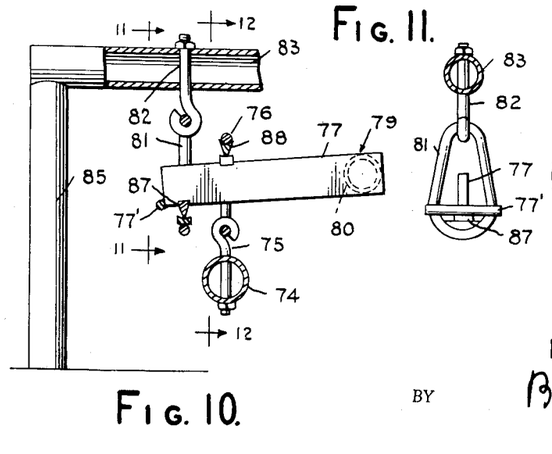
Figure 10 is an enlarged fragmentary vertical section on line 10—10 of Figure 9, parts in elevation, and parts omitted.
Figure 11 is a fragmentary vertical section on line 11—11 of Figure 10.
Figure 12:
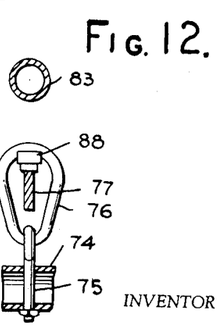
Figure 12 is a similar section on line 12—12 of Figure 10.

It is thus seen, that the long transverse bar 83 and the short bar 84, which are fixed, bodily carry the outer ends of the arms 77 of the relatively short force transmitting lever 79, through the medium of the eye bolts 82 and scale links 81. The scale links 81 react against depending knife elements 87 on the lower sides of the adjacent pair of arms 77, Figure 10, while the adjacent pair of scale links 76 have depending knife elements 88 at their tops, which react against the upper sides of the arms 77, Figure 10.

The inner end of the short lever 79 is supported by a vertical link 89, pivotally connected therewith, and having its upper end pivotally secured to the long lever 78. The connecting link 89 and adjacent end of the lever 79 are disposed at the transverse center of the hopper 64 and base 20, Figure 4. As shown clearly in Figure 4, the link 89 is connected with the long lever 78 at an intermediate point upon the same.

The pair of arms 77 of the longer force transmitting lever 78 have their inner ends rigidly secured to the ends of a horizontal connecting bar 90, similar to the bar 80 and parallel therewith and with the scale beams 74. The arms 77 of the lever 78 are in longitudinal alignment with the arms 77 of the lever 79, Figure 9, and the levers 78 and 79 are in vertical alignment, Figures 4 and 9. The lever 78 has one end rigidly secured to the horizontal connecting bar 90, at an intermediate point upon the same, and it may be seen that the levers 78 and 79 are secured to the bars 90 and 80 near and inwardly of one pair of corresponding ends of the same, Figure 9. With this arrangement the long lever 78 is spaced somewhat from the rear side of the adjacent vertical column 26, Figures 4 and 9, and cannot interfere with the same.

The arms 77 carried by the connecting bar 90 support the adjacent scale beam 74, and the outer ends of these arms 77 are received by another pair of scale links 91, corresponding to the links 81. The links 91 react against the lower sides of the adjacent arms 77, and have their upper ends pivotally connected respectively with depending eye bolts 92, in turn rigidly secured to the support bar 83, near the rear end of the base 20, and to a short horizontal support bar 93, near the forward end of the base 20, laterally opposite the support bar 84, Figure 9. The support bar 93 is rigidly mounted upon a relatively short vertical post 94, rigidly secured to the adjacent horizontal I-beam 21, laterally opposite the post 86.

The pair of scale links 76 just inwardly of the links 91, Figure 4, react against the upper sides of the adjacent arms 77, and serve to support the adjacent scale beam 74 from these arms, in the manner that the other links 76 support the other scale beam 74.

The ends of all of the arms 77 have short transverse stop pins 77' rigidly secured thereto by welding, and these stop pins prevent the links 76, 81 and 91 from being accidentally separated from the arms 77, during transportation of the apparatus, or the like.

It should be mentioned that the reason for employing the short horizontal supporting bars 84 and 93 near the forward end of the base 20, rather than a single continuous bar like the bar 83, is to avoid interference with the mobile concrete mixer, which must back close to the forward side of the hopper 64, during the loading of the mixer.

The end of the long force transmitting lever 78 remote from the bar 90 terminates adjacent to the left hand vertical column 26, Figure 4, and is apertured at 95 for connection with the operating element of a vertical spring scale 96, having its upper end secured at 97 to a short support arm 98, rigidly secured to the rear side of the adjacent column 26, Figures 3 and 4. The spring scale 96 is calibrated to provide the necessary range of scale readings for weighing the hopper 64 and its contents, when the hopper is supported by the scale beams 74. The scale 96, of course, does not bear the full weight of the hopper 64 directly, since only a fraction of the actual weight of the hopper is transmitted to the scale by the force transmitting or reducing levers 78 and 79, and associated mechanism.

In order to render the hopper 64 capable of engagement with the scale beams 74, I provide the hopper with four depending vertical legs 99, adjacent to its four corners, and these legs have their upper ends rigidly secured to the hopper just below the vertical side walls 65. The lower end of the legs 99 extend slightly below the lower end of the hopper 64, and the legs all terminate at the same elevation. Each leg 99 carries an inverted U-shaped foot 100, rigidly secured to its lower end, and arranged in vertical alignment with one of the scale beams 74. When the carriage 42 and hopper 64 are lowered sufficiently, the inverted U-shaped feet engage over the two scale beams 74, Figures 1, 2 and 5, and the legs 99 transmit the weight of the hopper and its contents to the scale mechanism. Suitable horizontal brace bars 101 may rigidly connect intermediate points of the legs 99 with the sides of the hopper 64, a substantial distance below their upper ends, to prevent the legs from moving out of alignment with the scale beams 74.

*Operation of the machine*

The free end of the cable 38 is connected with a shovel loading tractor, not shown, so that the carriage 42 and hopper 64 may be elevated and lowered by driving the tractor toward and from the rear side of the machine, Figure 2. When the tractor is driven away from the rear side of the machine, the cable 38 is unwound from the large spool 36, and the cables 47 are simultaneously wound upon the small spools 37, and the carriage 42 is elevated. When the tractor is driven toward the rear side of the machine, the cables 47 are unwound from the spools 37, and the carriage 42 and hopper are lowered by gravity, the cable 38 then being wound upon the large spool 36. If desired, the spools 36 and 37 may be grooved to assure that the convolutions of the cables 38 and 47 will lie properly upon the several spools, but the provision of grooves may not be necessary, and is optional. The length of the cable 38 is preferably such that the same will be entirely unwound from the spool 36 when the carriage 42 is elevated to its maximum height, and the carriage and hopper will therefore never strike the top of the tower. Likewise, the lengths of the cables 47 are preferably such that they will be entirely unwound from the spools 37 when the carriage 42 is fully lowered, and the hopper 64 is resting upon the scale beams 74, and the carriage 42 can therefore never be lowered into interference with the scale mechanism at the bottom of the machine.

When the carriage 42 and hopper have been lowered sufficiently for the inverted U-shaped feet 100 to engage over the scale beam 74, continued movement of the tractor toward the rear side of the machine will cause the carriage 42 to descend a further slight distance such as 4 or 5 inches. When this occurs, the lower cross bar 44 of the carriage will move downwardly within the inverted U-shaped brackets 73, and the U-bearings 62 will drop from supporting engagement with the trunnions 72, Figure 5. This downward movement of the carriage 42 will continue until the cables 47 are entirely unwound from the small spools 37, and then the carriage 42 will stop. At this time, the hopper 64 and its contents are supported entirely by the scale beams 74, and the spring scale 96 will register the weight of the hopper 64 and its contents. As previously stated, the hopper 64 is no longer supported by the carriage 42, as the carriage has dropped free of the hopper and is disposed slightly above the weighing mechanism, Figure 5. The hopper 64 may be filled while resting upon the scale mechanism, as shown in Figure 5, or it may be elevated somewhat with the carriage 42, and filled prior to lowering it into engagement with the scale beams 74.

When the loaded hopper 64 is resting upon the scale beams 74, its full weight is transmitted to the scale beams. This weight may be about six or eight thousand pounds, more or less, and is much greater than the spring scale 96 is capable of supporting directly. The function of the several links 76, 81 and 91 and long and short force transmitting levers 78 and 79 is to reduce the actual weight transmitted to the scale 96, and transmit only that fraction of the total weight of the hopper which the scale is capable of supporting. This force reduction, or stated differently, the mechanical advantage imparted to the spring scale 96 is effected first through the long lever 78, the arms 77 of which are suspended from the frictionless links 91. Next, the force reduction is carried through the shorter lever 79, suspended by the link 89 from approximately the middle of the lever 78, and the arms 77 of the lever 79 react downwardly upon the frictionless links 81. The final step in the force reducing system is through the frictionless links 76, supporting the scale beams 74. These links 76 are spaced a slight distance only from the links 81 and 91, and a great mechanical advantage is gained for the scale 96, due to the closeness of the links 76 to the links 81 and 91, within which the several arms 77 are rockably suspended.

In short, a relatively small or weak spring scale 96, capable of supporting say 100 or 200 pounds, can because of the above described force reducing system reflect the true weight of the loaded hopper 64, which may weigh thousands of pounds, as previously stated. The scale 96 is of course properly graduated to reflect the actual weight of the hopper 64, plus its contents, the weight of the carriage 42 never being borne by the scale beams 74.

When the hopper 64 has been filled and weighed, it is then elevated with the carriage 42 to the desired elevation above the base 20 by drawing the cable 38 rearwardly of the machine. It should be mentioned that it is not necessary to employ a tractor, or for that matter, any vehicle to operate the cable 38, and this is merely a preferred arrangement, since the speed reduction between the large and small spools 36 and 37 is sufficient to render practical the raising and lowering of the carriage 42 by a tractor, or the like. If desired, the cable 38 may be connected with a stationary power-operated winch, or the like, located rearwardly of the machine. Also, the hopper may be filled by means other than a shovel loading tractor, or by hand, and that is largely a matter of choice.

When the cable 38 is pulled rearwardly of the machine to elevate the hopper 64 after the weighing operation, the carriage 42 will first move upwardly into supporting engagement with the hopper before elevation of the hopper begins. The carriage cross bar 44 moves upwardly within the inverted U-shaped brackets 73, and the U-bearings 62 will move upwardly and again support the trunnions 72. Continued drawing of the cable 38 rearwardly of the machine elevates the carriage 42 and hopper 64 as a unit, to the desired elevation above the particular concrete mixer to be filled with the contents of the hopper. When the hopper 64 reaches the desired elevation, the concrete mixer truck is backed toward the forward side of the machine, and the pivoted gate valve 69 is opened to allow the contents of the hopper to discharge downwardly and forwardly into the intake hopper of the mixer.

It is obvious that within the limits of the height of the columns 26, the hopper 64 may be arranged at any desired elevation above the base 20 for discharging its contents into concrete mixer trucks having intake hoppers of various heights, and a great amount of unnecessary waste of the dry concrete aggregates is avoided.

When it is desired to transport the machine to a new location, the carriage 42 and hopper 64 are lowered until the hopper rests upon the scale beams 74, and the hopper is then locked to the carriage by inserting a pair of bolts 102, or the like, through apertures 103 formed within the lower ends of the inverted U-shaped brackets 73. This locks the carriage cross bar 44 within the inverted U-shaped brackets 73 of the hopper, Figure 15, and the carriage and hopper are locked against relative movement. The carriage 42 is now also locked against movement relative to the base 20 by applying a double-ended hook bar 104 for the carriage cross-bar 44 and the transverse bar 24 of the base 20, see Figures 14 and 16.

A non-rotatable axle 105 having a pair of rubber tired wheels 106 journaled thereon is now engaged within slots 107 formed within the leading ends of the horizontal I-beams 21, the entire machine being tilted rearwardly about the rear end of the beam 21 to permit the introduction of the axle 105 into the slots 107. Inwardly of the wheels 106, the axle 105 carries a pair of apertured plates 108, which engage the outer sides of the horizontal I-beams 21, Figure 17. The I-beams 21 are apertured just inwardly of the slots 107, as shown at 109, and bolts 110 are inserted through the registered apertures of the plates 108 and I-beams 21, for rigidly securing the axle 105 to the base 120. When this has been done, the entire machine is tilted forwardly about the wheels 106 to a substantially horizontal position, Figure 14, and the apertured plates 32 of the tongue sections 31 receive the hitch-bolt of a suitable towing vehicle 111, Figure 14. The machine may now be transported to a new location and set up again as shown in Figures 1 and 2, when, of course, the bolts 102 and hook bar 104 are removed, so that the machine may operate.

While the machine is in the horizontal position for transportation, Figure 14, the hopper trunnions 72 are supported by the extended sides 63 of the U-bearings 62, which are then horizontal. Also the carriage cross bar, at this time supports the lower end of the hopper, which virtually hangs from the bar 44 by the brackets 73.

While I have shown and described the spring scale 96 in connection with the weighing mechanism, it should be understood that other types of scales, such as dial scales, beam scales or the like, may be employed instead of the spring scale 96, the type of scale being largely a matter of choice by the user.

I also wish to point out that the machine is adaptable for handling various other kinds of materials such as dry fertilizers, mixed feeds, grain or the like, and I do not wish to limit the invention to the handling of dry concrete aggregates.

It is to be understood that the form of the invention, herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A machine for weighing and transferring concrete aggregates and the like comprising a single pair only of spaced uprights which are unobstructed between their inner sides throughout substantially their entire lengths, a substantially U-shaped carriage arranged between the uprights and movably connected with the uprights and adapted to be raised and lowered and serving to prevent the uprights from spreading apart laterally between their ends, the U-shaped carriage being open at its top, a hopper cradled within the U-shaped carriage to be raised and lowered therewith and having a lower discharge end spaced a substantial distance laterally beyond corresponding sides of the uprights, whereby the intake hopper of a mobile concrete mixer may be positioned beneath the discharge end of the hopper without interfering with said uprights, means connected with the carriage to raise and lower the same, and weighing mechanism arranged near the bottoms of the uprights to receive and support the hopper when the carriage and hopper are lowered.

2. A machine for weighing and transferring concrete aggregates and the like comprising a single pair only of spaced uprights which are unobstructed between their inner sides throughout substantially their entire lengths, a substantially U-shaped carriage having its top open and arranged between the uprights and movably connected therewith to be raised and lowered, means associated with the uprights and carriage to lock the uprights against appreciable lateral spreading between their ends, whereby the carriage serves as a movable brace for the uprights, a hopper mounted upon the carriage and adapted to be raised and lowered therewith and extending forwardly and rearwardly of the uprights for substantial distances and having a bottom discharge end spaced a substantial distance from corresponding sides of the uprights, means connected with the hopper to elevate and lower the same, and scale mechanism arranged near the bottoms of the uprights for receiving and supporting the hopper and its contents when the carriage and hopper are lowered, the U-shaped carriage disengaging the hopper and dropping below the same when the hopper is engaged and supported by said scale mechanism.

3. A machine for weighing and transferring concrete aggregates comprising a pair only of spaced uprights which are substantially unobstructed between their inner sides throughout substantially their entire lengths, a substantially U-shaped carriage having its top open and including a bottom transverse bar and side substantially vertical members arranged between the uprights and movably connected therewith, a hopper cradled within the U-shaped carriage eccentrically of the center of gravity of the hopper and having a lower discharge end spaced a substantial distance laterally beyond corresponding sides of the uprights, a reaction member secured to the hopper and engaging said bottom transverse bar of the carriage and preventing the hopper from pivoting relative to the carriage and uprights, cable means connected with the carriage to raise and lower the same, rotatable winding means mounted upon the uprights near their top ends and connected with the cable means to wind up and pay out the same, and weighing mechanism mounted near the lower ends of the uprights and adapted to engage and support the hopper when the carriage and hopper are lowered, said carriage disengaging and dropping free of the hopper when the hopper is supported by the weighing mechanism, the carriage being prevented from moving downwardly into interference with the weighing mechanism by the complete paying out of the cable means from the winding means prior to engagement of the carriage with the weighing mechanism.

4. Apparatus for weighing, hoisting and discharging concrete aggregates and the like comprising a tower embodying a single pair only of spaced uprights, a substantially U-shaped open top carriage arranged between the uprights to be raised and lowered therealong, rollers carried by the carriage for guiding engagement with the uprights, flange parts secured to the uprights adjacent their inner sides and forming with the uprights longitudinal passages within which the rollers are locked against appreciable endwise movement relative to the uprights, whereby the carriage forms a movable bracing means for the uprights to prevent the uprights from bowing, a hopper cradled within the U-shaped carriage and adapted to be raised and lowered therewith, legs secured to the hopper and adapted to support the hopper, scale mechanism including a pair of spaced substantially horizontal scale beams positioned near the bottoms of the uprights and adapted to be engaged by the legs and to support the weight of the hopper when the carriage and hopper are lowered, the hopper extending forwardly and rearwardly of the spaced uprights for substantial distances and having its top open and unobstructed by the carriage, the hopper having a lower discharge end spaced a substantial distance from corresponding sides of the uprights, a pair of cables connected with the sides of the U-shaped carriage to raise and lower the same, and winding and unwinding means for the cables secured to the tower near its top, the cables being completely unwound from said means when the hopper is supported by the scale beams, the carriage then being disengaged from the hopper and spaced below the hopper but held out of engagement with the scale mechanism by the completely unwound cables.

5. Apparatus for weighing, hoisting and discharging concrete aggregates and the like comprising a pair only of spaced uprights which are substantially unobstructed between their inner sides throughout substantially their entire lengths, a substantially horizontal base rigidly secured to the bottoms of the uprights and extending for substantial distances forwardly and rearwardly of the uprights to stabilize the uprights, weighing mechanism arranged between the uprights near their lower ends, a substantially horizontal rotatable shaft journaled upon the uprights near their top ends, means connected with the shaft to rotate the same, a pair of cables connected with the shaft to be wound upon the same and unwound, a substantially U-shaped open top carriage arranged between the uprights in the plane of the uprights and having sides secured to the cables, pairs of rollers journaled upon the sides of the carriage near its upper and lower ends and having guiding engagement with the uprights, flange elements secured to the inner sides of the uprights and extending throughout substantially their entire lengths and forming with the uprights longitudinal passages within which the rollers are caged to prevent appreciable bowing of the uprights between their ends, an open top hopper cradled within the U-shaped carriage between the uprights and having its top unobstructed by the carriage and projecting forwardly and rearwardly of the uprights and carriage in a plane at right angles to the plane of the uprights and carriage, the hopper having a bottom discharge opening spaced a substantial distance laterally of corresponding sides of the uprights and carriage, and legs secured to the hopper and adapted to engage the weighing mechanism when the carriage and hopper are lowered for lifting the hopper from the carriage, the carriage descending below the hopper when the legs engage the weighing mechanism and having its downward movement checked short of contact with the weighing mechanism by the complete unwinding of the cables from said rotatable shaft.

6. Apparatus for weighing, hoisting and discharging material comprising a pair only of spaced uprights, a substantially U-shaped open top carriage arranged between the uprights in the plane of the uprights and movably connected with the uprights to be raised and lowered, a hopper mounted upon the carriage for movement therewith when the carriage is raised and lowered, the hopper extending forwardly and rearwardly of the uprights in a direction perpendicular to the plane of the uprights and having a bottom discharge end spaced a substantial distance from corresponding sides of the uprights, weighing mechanism arranged near the bottom of the uprights to receive and support the hopper and lift the hopper from the carriage when the carriage and hopper are lowered, the carriage being adapted to drop free of the hopper due to its open top and U-shape, cables connected with the sides of the carriage and extending above the carriage, a rotatable shaft journaled upon the uprights near their top ends and connected with the cables for winding and unwinding the same, the cables being fully unwound from the shaft when the hopper is supported by said weighing mechanism and the carriage has dropped free of the hopper and is still spaced above the weighing mechanism, a winding and unwinding drum secured to the rotatable shaft, a cable connected with said drum and extending downwardly therefrom, guide means for the cable near the lower ends of said uprights so that the cable may extend substantially horizontally of the uprights near their lower ends for connection with a draft device.

7. Portable apparatus for weighing, hoisting and discharging concrete aggregates and the like comprising a pair only of spaced uprights which are unobstructed between the same throughout substantially their entire lengths, a substantially horizontal base including a pair of substantially horizontal bars rigidly secured to the uprights adjacent their lower ends and extending for substantial distances forwardly and rearwardly of the uprights, a substantially U-shaped carriage arranged between the uprights and movably connected therewith and adapted to be raised and lowered, cable means connected with the carriage and uprights to raise and lower the carriage, weighing mechanism arranged near the bottoms of the uprights and secured to said base, substantially U-shaped bearing parts carried by the sides of said carriage and having relatively long sides extending longitudinally of the sides of the carriage and uprights, a hopper arranged between the uprights, trunnions secured to opposite sides of the hopper and resting in said bearing parts of the carriage, elements carried by the hopper end engaging the bottom of the carriage to prevent the hopper from pivoting about the trunnions, the hopper being engageable with said weighing mechanism to be supported thereby free of the carriage when the carriage and hopper are lowered, detachable wheel means to be connected with corresponding ends of said horizontal bars when the uprights are shifted to substantially horizontal positions and said bars are substantially vertical, means connected with the ends of the uprights remote from said base for connecting the uprights with a towing vehicle, said long sides of the U-shaped bearing parts then being arranged substantially horizontally beneath the trunnions of the hopper for supporting the hopper, means for locking said elements of the hopper to the bottom of the carriage when the carriage and uprights are disposed substantially horizontally, and means connecting said carriage and base to lock the carriage against movement longitudinally of the uprights when the uprights are substantially horizontal.

8. In a machine for handling concrete aggregates, a supporting structure including a single pair only of spaced uprights which are open and unobstructed between their inner sides throughout substantially their entire lengths, a substantially U-shaped carriage movably connected with said uprights and adapted to be raised and lowered and having its top side open, means movably connecting the sides of the carriage and uprights and permitting the carriage to move longitudinally of the uprights and restraining the uprights from appreciable lateral flexure inwardly or outwardly, a hopper supported by said carriage and having forward and rear sides spaced substantial distances forwardly and rearwardly of the pair of uprights and having its top open and substantially unobstructed forwardly and rearwardly of the uprights and carriage, the hopper being substantially unenclosed at its sides except for the single pair of uprights, and means connected with the carriage to elevate and lower the same.

9. In a machine for handling concrete aggregates, a supporting structure including a single pair only of spaced uprights which are open and unconnected throughout the major portions of their lengths, a substantially U-shaped carriage arranged between the uprights and having its top side open and adapted to be raised and lowered, means movably connecting the sides of the carriage and uprights and permitting the carriage to move longitudinally of the uprights and preventing appreciable lateral movement of the uprights relative to the carriage, a relatively wide open top hopper supported by the carriage and having an inclined bottom and forward and rear sides spaced substantial distances from the forward and rear sides of the uprights, the hopper having a bottom discharge opening near the juncture of one side of the hopper and said inclined bottom and spaced a substantial distance from corresponding sides of the uprights, the hopper being unenclosed at all sides except for the pair of uprights and having its open top unobstructed forwardly and rearwardly of the uprights, and means connected with the carriage to elevate and lower the same.

References Cited in the file of this patent

UNITED STATES PATENTS

| | | |
|---|---|---|
| 1,258,434 | Nelson | Mar. 5, 1918 |
| 1,984,606 | Thomas | Dec. 18, 1934 |
| 2,152,247 | Endacott | Mar. 28, 1939 |
| 2,207,053 | Fivecoate et al. | July 9, 1940 |
| 2,212,711 | MacIsaac | Aug. 27, 1940 |
| 2,357,583 | Franco | Sept. 5, 1944 |
| 2,508,507 | Fowler | May 23, 1950 |
| 2,565,792 | Wagner et al. | Aug. 28, 1951 |